US008688766B2

(12) United States Patent
Varvello et al.

(10) Patent No.: US 8,688,766 B2
(45) Date of Patent: Apr. 1, 2014

(54) METHOD FOR MANAGING THE ALLOCATION OF DATA INTO A PEER-TO-PEER NETWORK AND PEER IMPLEMENTING SUCH METHOD

(75) Inventors: Matteo Varvello, Port Monmouth, NJ (US); Christophe Diot, Paris (FR); Ernst W. Biersack, Le Rouret (FR)

(73) Assignee: Thomson Licensing, Issy-les-Moulineaux (FR)

( * ) Notice: Subject to any disclaimer, the term of this patent is extended or adjusted under 35 U.S.C. 154(b) by 776 days.

(21) Appl. No.: 12/716,599

(22) Filed: Mar. 3, 2010

(65) Prior Publication Data
US 2011/0219069 A1    Sep. 8, 2011

(51) Int. Cl.
*G06F 15/16*    (2006.01)

(52) U.S. Cl.
USPC ........... 709/201; 709/231; 709/232; 709/235; 718/102; 718/104; 718/105

(58) Field of Classification Search
USPC ......... 709/201, 217–219, 231, 232, 235, 238; 718/100, 102, 104, 105
See application file for complete search history.

(56) References Cited

U.S. PATENT DOCUMENTS

| | | | |
|---|---|---|---|
| 8,019,882 B2 * | 9/2011 | Rao et al. | 709/230 |
| 8,112,477 B2 * | 2/2012 | Rao et al. | 709/203 |
| 8,190,630 B2 * | 5/2012 | Nakadai | 707/769 |
| 2008/0130516 A1 * | 6/2008 | You et al. | 370/254 |
| 2008/0288654 A1 * | 11/2008 | Matuszewski et al. | 709/238 |
| 2009/0327505 A1 * | 12/2009 | Rao et al. | 709/230 |
| 2010/0131550 A1 * | 5/2010 | Nakadai | 707/769 |
| 2012/0005675 A1 * | 1/2012 | de Waal | 718/1 |

\* cited by examiner

*Primary Examiner* — Kenneth Coulter
(74) *Attorney, Agent, or Firm* — Myers Wolin LLC

(57) ABSTRACT

A method and apparatus to manage allocation of data to peers in a peer-to-peer network, where the peers in the peer-to-peer network use distributed hash tables for addressing the peers, the peers associated with bit addresses, including dividing a virtual scene into a plurality of cells, each cell associated with a bit identifier, neighboring cells of the virtual scene associated with bit identifiers which differ from each other by one bit and allocating data in each cell of the virtual scene to peers whose bit address is closest to the bit identifier of the cells.

19 Claims, 4 Drawing Sheets

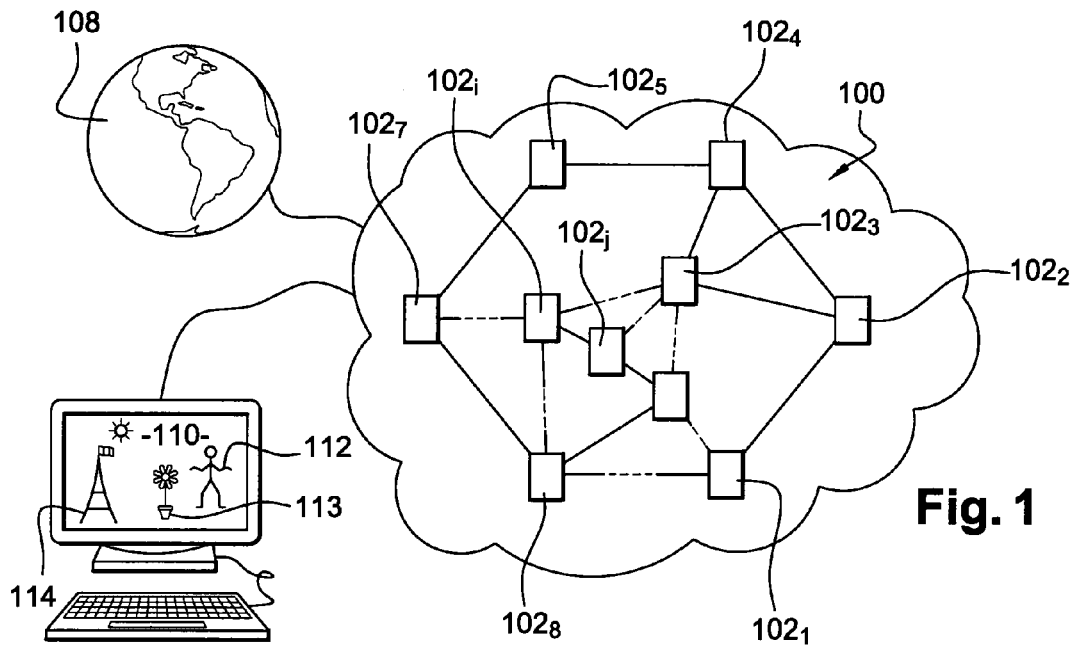
Fig. 1
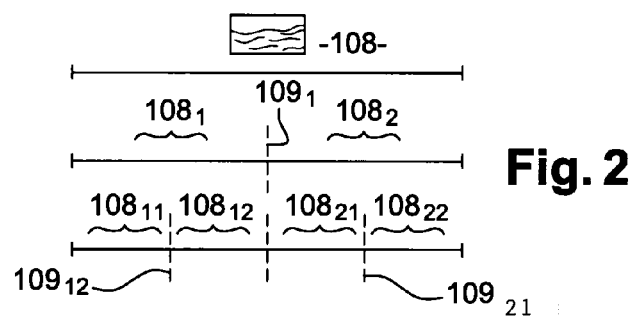
Fig. 2
Fig. 3

METHOD FOR MANAGING THE ALLOCATION OF DATA INTO A PEER-TO-PEER NETWORK AND PEER IMPLEMENTING SUCH METHOD

FIELD OF THE INVENTION

The invention relates to a method for managing the allocation of data in a peer-to-peer (P2P) network and to a peer implementing such method.

BACKGROUND OF THE INVENTION

Peer-to-Peer networks, called thereafter P2P networks, are increasingly used in computing operations since they allow, among other things, the distribution of data between different peers in order to share a work load between different computers.

For that purpose, P2P network operations are based on a fair distribution of application data so that each peer is supposed to deal with an amount of data practically identical.

In order to perform such a distributed application, a first peer generally needs to retrieve data stored by second peers addressed through DHTs, for "Distributed Hash Tables", which references the peers wherefrom content can be downloaded.

The fair data distribution within a P2P network might lead to unsatisfactory delays for performing an application since the performing peer might not be directly linked—i.e. might not reference through its DHT—second peers wherefrom data has to be downloaded. Thus, intermediate peers must route the required data, from such second peers to the performing peer, so that a significant delay might be required to allow the performance of the application.

SUMMARY OF THE INVENTION

The invention results from the finding that, for applications aimed to generate a dynamic virtual view of a scene, different delays for performing the application—i.e. to transmit data between peers—is acceptable depending on whether the data relate to either apparently close or apparently far elements of the virtual scene, the closeness (proximity) being estimated from the view.

Indeed virtual interactions with apparently close elements of the scene should be performed with a shorter delay than virtual interactions with apparently far elements of the scene in order to provide an acceptable interactive feature to the scene.

As a consequence, a short transmission delay of the data which codes apparently close elements of the dynamic virtual view is required as opposed to an acceptable longer transmission delay of the data coding apparently far elements of the dynamic virtual view.

To achieve this and other advantages, and in accordance with the purpose of the invention as embodied and broadly described herein, the present invention relates to a method to manage the allocation of data in a P2P network wherein a peer uses Distributed Hash Tables for referencing close peers, the peers being associated with respective bit addresses, wherein, the data to be allocated coding a virtual scene wherefrom a view has to be computed in order to be displayed to an end user, it includes the following steps:

The step of dividing the scene into cells, each cell being associated with a bit identifier so that neighboring cells in the scene are associated with neighboring identifiers which only differ from each other by one bit, The step of allocating the piece of the data coding a cell to the peer whose bit address is the closest to the bit cell identifier.

According to the invention, the data coding neighboring cells of a scene are allocated to close peers which maintain routing information between themselves so that the close peers are directly linked.

Thus, the transmission of data between such close peers—which correspond to the transmission of data coding apparently close elements as estimated from the view—is performed with short transmission delays.

As a consequence, a peer implementing a method according to the invention delivers short delay interactions with the apparently close elements and longer delay interactions with apparently far elements, rendering P2P networks acceptable for virtual representation applications.

In one embodiment, the method further includes the step of determining a distance between peer addresses and/or cell identifiers using a bitwise exclusive operation (XOR).

In one embodiment, the method further includes the step of defining neighboring cells as cells having at least one of the following elements: common coding data, adjacent elements in the scene, a symmetric property deriving from the scene division.

In one embodiment, the invention further includes the step of considering cells as scenes in order to iteratively apply the steps of dividing a given scene and allocating the data.

In one embodiment, the invention further includes the step of iteratively performing the steps of dividing a given scene and allocating the data of said given scene through a reverse binary tree including nodes and leafs wherein:

each node represents a division, and each leaf represents one cell generated by the divisions of the nodes wherefrom it derives, so that a cell identifier is produced for each cell on the basis of the divisions followed in the binary tree to reach the leaf representing said cell from an original cell representing the scene.

In one embodiment, two leafs derive from each node so that a different bit is given to each of the identifiers associated with each of the two leafs.

In one embodiment, the scene having a plurality of dimensions, the method includes the further step of iteratively applying the steps of dividing a given scene and allocating the data among each dimension independently.

In one embodiment, the method includes the further step of dividing a scene when the number of objects within such scene and/or the amount of data coding this scene reaches a given threshold.

In one embodiment, the scene is a virtual world and the view corresponds to a representation thereof for an avatar guided by the end-user within the virtual world.

In one embodiment, a scene division is performed through a dividing axis which symmetrically splits the scene into two cells having practically identical sizes.

The invention also relates to a peer using Distributed Hash Tables for referencing close peers within a P2P network, the peers being associated with respective bit addresses, wherein, the peer having to allocate data coding a virtual scene wherefrom a view has to be computed in order to be displayed to an end user, it includes:

Means for dividing the scene into cells, each cell being associated with a bit identifier so that neighboring cells in the scene are associated with neighboring identifiers which only differ from one bit, and Means for allocating the piece of the data coding a cell to the peer whose bit address is the closest to the bit cell identifier following a method according to any of the previous embodiments.

A method and apparatus to manage allocation of data to peers in a peer-to-peer network, where the peers in the peer-to-peer network use distributed hash tables for addressing the peers, the peers associated with bit addresses, including dividing a virtual scene into a plurality of cells, each cell associated with a bit identifier, neighboring cells of the virtual scene associated with bit identifiers which differ from each other by one bit and allocating data in each cell of the virtual scene to peers whose bit address is closest to the bit identifier of the cells.

BRIEF DESCRIPTION OF THE DRAWINGS

Reference will now be made in detail to the present preferred embodiment of the invention, an example of which is illustrated in the accompanying drawings wherein:

FIG. 1 represents a P2P network implementing the invention,

FIGS. 2 and 3 represent the generation of cells and their identifiers according to one embodiment of the invention applied to a scene having one dimension.

DETAILED DESCRIPTION OF THE EMBODIMENTS OF THE INVENTION

Figure 4:
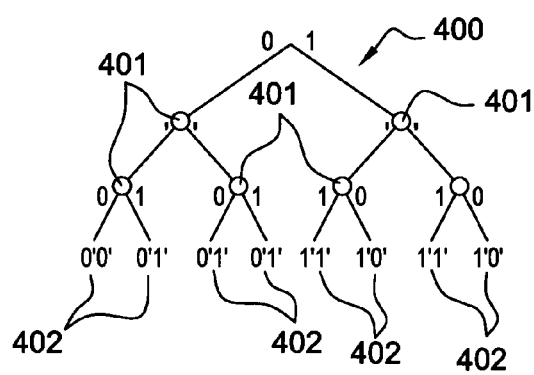
FIGS. 4 to 9 represent the generation of cells and their identifiers according to one embodiment of the invention applied to a scene having two dimensions.

Wherever possible, the same reference numerals will be used throughout the drawings to refer to the same or like parts.

In reference to FIG. 1, a P2P network 100 implementing the invention is based on a Kademlia structure as defined, for instance, by P. Maymounkov and D. Mazieres in *"Kademlia: a peer-to-peer information system based on the XOR metric"*; published in IPTPS, Cambridge, Mass., USA on March 2002.

According to such Kademlia structure, each peer $102_1$, $102_2 \ldots 102_i, 102_j$ of the network 100 is identified by a 160-bit address so that a distance can be computed between two addresses as their bitwise exclusive or (XOR).

For instance a peer $102_i$ can establish for each of its address bits, a list of peers with a XOR distance between $2^i$ and $2^{(i+1)}$, the list being called thereafter k-buckets where k defines the maximum number of entries per bucket. By definition, the entries in the $n^{th}$ k-bucket have a different $n^{th}$ bit from the peer identifier.

Considering a message to be routed in such Kademlia P2P network 100, a peer $102_i$ uses its buckets in order to transmit the routed message to a second peer which is either the destination peer or the peer having the closest address as compared to the destination peer address.

In this embodiment, a message sent to a destination address, also called destination key, is simply routed to one of the peers from the bucket with the longest common prefix to the target (destination) key.

As explained hereafter, such routing across intermediate peers might be avoided for local queries when the network 100 implements the invention and the data allocated to the peers $102_i$ codes a virtual scene 108.

Typically, this is the case when the scene 108 is a virtual world and the view 110 corresponds to a representation thereof for an avatar 112 guided by an end-user within the virtual world.

In this case, some elements of the virtual world appear relatively close to the end-user—for instance a flower 113 close to the avatar 112—whereas other elements appear relatively far from the end-user—for instance a monument 114.

In order to deliver short transmission delays for the data which codes apparently close elements as opposed to longer transmission delay for the data coding apparently far elements relatively to the dynamic virtual view, peers $102_1$, $102_2 \ldots 102_i, 102_j$ perform divisions of the scene into cells, associated with a bit identifier, whereby neighboring cells in the scene are associated with neighboring identifiers which only differ from each other by one bit.

As illustrated in FIG. 2, division of the scene 108 might be iterative so that a generated cell $108_1$ or $108_2$ is considered as a scene 108 to be divided.

The criterion to perform a scene (cell) division might vary from one embodiment to another of the invention and, for instance, could be based on having the number of objects within such scene (cell) and/or having the amount of data coding such scene (cell) reaching a given threshold.

As represented in FIG. 2, the division of a cell is performed in this embodiment through dividing axis $109_1$, $109_{12}$ and $109_{21}$ which symmetrically splits the divided scene or cells into two cells having practically identical sizes.

In reference to FIG. 3 is illustrated the generation of bit sequences 300 which respect the criterion of differing from one bit successively effectively using a reflective or Gray code:

0 or 1 for 1 bit identifiers;
00, 01, 11 or 10 for 2 bit identifiers;
000, 001, 011, 010, 110, 111, 101, 100 for 3 bit identifiers.

Thus, such identifiers could be allocated to cells generated according to the split process illustrated in FIG. 2 in order to have two neighboring cells identifiers differing from one bit, the neighboring cells representing at least one of the following elements: common coding data, adjacent elements in the scene, a symmetric property deriving from the scene division.

For instance, generated cells $108_{11}$, $108_{12}$, $108_{21}$ or $108_{22}$ could be respectively associated with identifiers 00, 01, 11 or 10 since:

cells (e.g. $108_{11}$ and $108_{12}$) having adjacent elements are correctly associated with identifiers differing from only one bit (e.g. 00 and 01), and cells (e.g. $108_{11}$ and $108_{22}$) symmetrically located toward a dividing axis ($109_1$) are also correctly associated with identifiers differing from only one bit (e.g. 00 and 10) when the scene of FIG. 2 is considered as wrapping horizontally around axis 109 and axis 109 itself wraps around vertically.

Figure 5:
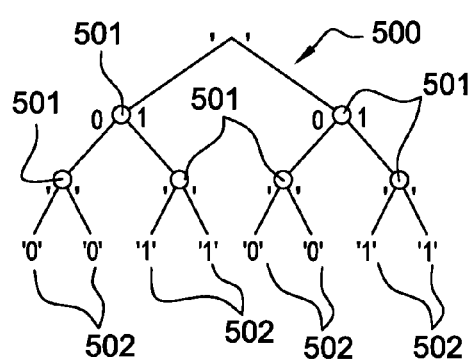
Figure 6:
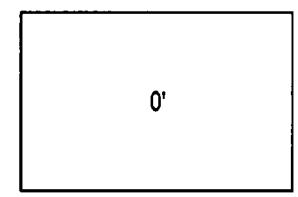
Figure 7:
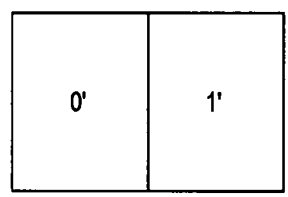
Figure 8:
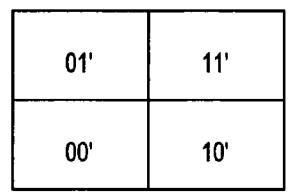
Figure 9:
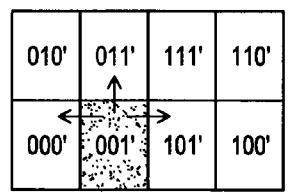

In order to automatically generate identifiers while performing cell divisions, reverse binary trees 400 (FIG. 4) or 500 (FIG. 5) comprising nodes 401/501 and leafs 402/502 might be used so that:

each node 401/501 represents a scene (cell) division, and
each leaf 402/502 represents a cell generated by the divisions of the nodes wherefrom it derives.

Indeed, in a reverse binary tree, the nodes of each level of the tree are labeled with an 1-bit Gray code as defined, for instance, in the patent application U.S. Pat. No. 2,632,05 published on March 1953.

Thus, a cell identifier can be produced for each cell—associated with a leaf 402—on the basis of the path—i.e. the nodes or divisions—followed in the binary tree to reach the associated leaf 402.

Practically, the cell identifier might be a bit sequence formed by added 1 or 0 at each node which derives in two leafs.

Considering a multidimensional scene 108, the cells divisions can be performed successively on each different dimension through each different binary tree 401 or 501. In this case, cell identifiers produced on a given dimension keep an indication of a division performed on another previous dimension.

For instance, four successive divisions on, alternatively, vertical or horizontal dimensions are represented on binary trees 400 or 500 so that, for instance, the first node 402 of the vertical binary tree 401 reflects a vertical division—which determines an identifier within the vertical tree—while the first node 501 of the horizontal binary tree 501 do not modify such identifier—which do not determine an identifier within the horizontal tree, a "*" being used instead of a given bit number.

Similarly, the second nodes 501 of the horizontal binary tree 500 reflects a horizontal division—which determines an identifier within the horizontal tree—while the second nodes 401 of the vertical binary tree 400 do not modify such identifier—no identifier is given within the vertical tree 401, a "*" being used instead of a given bit number.

As successively illustrated in FIGS. 6, 7, 8 and 9, such succession of vertical (FIGS. 6 and 8) and horizontal (FIGS. 7 and 9) divisions delivers identifiers which respect the given criteria whereby two neighboring cells identifiers differ from each other by one bit.

Once the scene has been divided into cells as required, the piece of the data coding a cell can be allocated to the peer whose bit address is the closest to the bit cell identifier.

In order to estimate the distance between a peer address and a cell identifier, a bitwise exclusive operation (XOR) can be performed keeping in mind that, in the Kademlia space, the peers addresses are based on a 160-bit sequence. Thus, the identifier generated as disclosed hereinbefore might be completed by sequences of 0 bits in order to form such a 160-bit sequence.

A peer $102_i$ responsible for a cell is known as "coordinator" and is selected as the XOR closest peer to the cell identifier. In this embodiment, there are R coordinators for each cell i.e. each cell is replicated at R peers.

In order to determine the coordinator peers of generated cells, the scene division can be performed through the following steps:

Initialization:

A bootstrap node identifies the R coordinators of an initial cell C(0,0) by performing a lookup in the DHTs for the cell identifier k(0,0) of the initial cell C(0,0). At this time, the coordinator peers are responsible for the entire virtual scene, host all objects created in the initial cell C(0,0) and answer all range queries.

Split:

When a cell C(I,i) is split into cells C(I+1,2i+1) and C(I+1,2i+2), its coordinators do select the coordinators for the generated C(I+1,2i+1) and C(I+1,2i+2) cells by performing a Kademlia lookup for cell identifiers k(I+1,2i+1) and k(I+1,2i+2) of the generated cells.

Thereafter, the split cell coordinators transfer to the coordinators of C(I+1,2i+1) and C(I+1,2i+2) the list of C(I,i) neighboring cells and distribute the virtual objects currently located in C(I,i) to the coordinators of the cell C(I+1,2i+1) and C(I+1,2i+2) according to the object coordinates.

Coordinator Selection:

A peer selected to be a coordinator for a cell C(i,I), having k(I,i) as identifier, does derive the I identifiers having a Hamming distance of 1—i.e. differing from one bit—from k(I,i) in order to compare each of these identifiers with the list of the identifiers received during the split, or division. Thus, the neighboring identifiers can be determined before performing a Kademlia lookup for each existing neighbor identifier.

Thus, such neighbor identifiers can populate their k-bucket with the routing information towards the next level neighbor coordinators, such neighbor coordinators being informed that a new cell was created.

Following the example of an application wherein the scene is a virtual world wherein an avatar is guided by an end user, it could be supposed that a peer P submitting a range query knows the R coordinators of the cell where the avatar is located. In this case, such peer P sends a query to one of these R coordinators which can answer such query, or a portion of it, while transmitting routing information towards the coordinators for the cells intersecting with the query's range.

In case a coordinator does not have a complete view of the entire range, it forwards the query to the coordinators of the closest cell to this range which should have a more detailed view of this portion of the virtual world. Therefore P can directly contact the set of coordinators responsible for the query's range to retrieve the information about the virtual objects located in this portion of the world.

Figure 10:
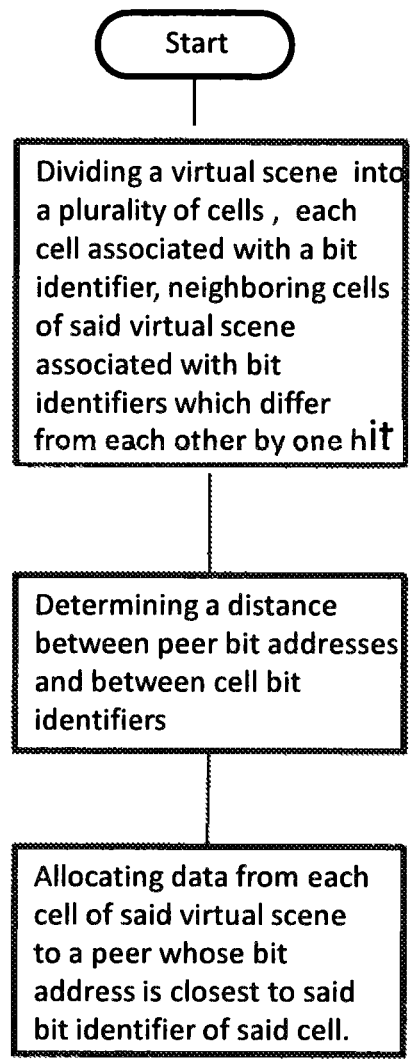
FIG. 10 is a flowchart of an exemplary embodiment of the method of the present invention.

FIG. 10 is a flowchart of an exemplary embodiment of the method of the present invention. The present invention is directed to managing allocation of data to peers in a peer-to-peer network, where the peers in the peer-to-peer network use distributed hash tables for addressing the peers, the peers associated with bit addresses. At 1005 a virtual scene is divided into a plurality of cells, each cell associated with a bit identifier, neighboring cells of the virtual scene associated with bit identifiers which differ from each other by one bit. At 1010 a determination is made of a distance between peer bit addresses and between cell bit identifiers. The distance determinations are made using one of a bitwise exclusive or Hamming codes. At 1015 an allocation is made of data in each cell of the virtual scene to peers whose bit address is closest to the bit identifier of the cells. The data in the neighboring cells is at least one of common coding data, adjacent elements in the virtual scene and a symmetric property derived from the scene division. At each division the cells differ from all other cells at that level of division by one bit. The method also iteratively allocates the data in each cell. The division of the virtual scene into cells is accomplished using a reverse binary tree including nodes and leafs wherein each node represents a division and each leaf represents a cell generated by the division of a cell at a next higher level (node from which it was derived). The cell identifier of each cell is produced by following a binary tree from the virtual scene to reach the leaf representing the cell. Each node is divided into two leafs, each leaf having a bit identifier associated with it, wherein the identifiers of each leaf having a common ancestor node, the bit identifiers differ from each other by one bit. The virtual scene may have a plurality of dimensions and the method of the present invention is executed independently for each dimension. The division of the virtual scene continues until an amount of data coding in a cell reaches a threshold (which may be predetermined) or until a number of leafs has reached a threshold (which may be predetermined). The scene division is performed iteratively through a dividing axis which symmetrically splits the scene into two cell having nearly identical sizes. For example, the virtual scene (or scene portion) may be divided in half at each level. The division can be, for example, along a horizontal or vertical axis. The virtual scene may represent a virtual world and a virtual view corresponds to a representation of the virtual world for an avatar guided by an end user within the virtual world.

Figure 11:
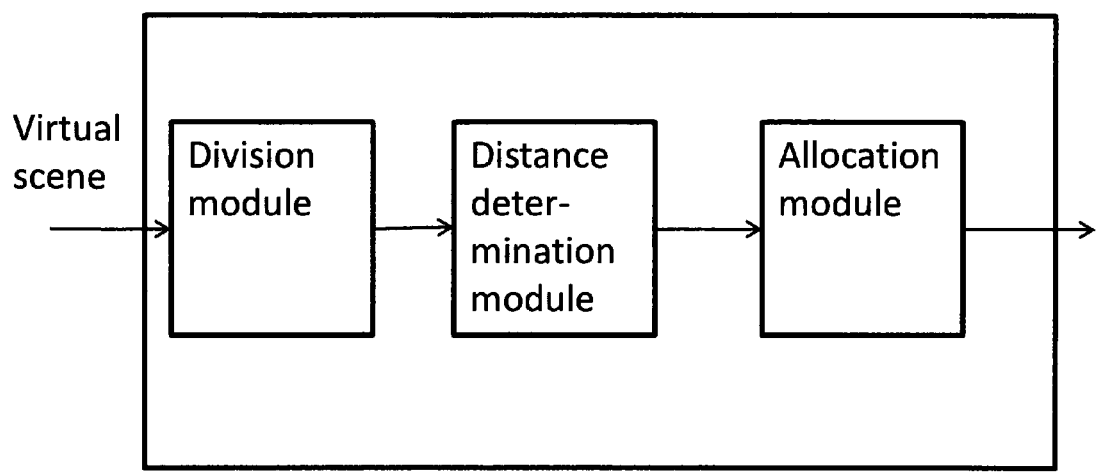
FIG. 11 is a block diagram of an exemplary embodiment of an apparatus in accordance with the principles of the present invention.

FIG. 11 is a block diagram of an exemplary embodiment of an apparatus in accordance with the principles of the present invention. The apparatus is a peer capable of performing the steps of the method of the present invention. The portion of the peer capable of performing the steps of the method of the present invention may be implemented as hardware, software, firmware, special purpose processors, or any combination thereof. Preferably, the present invention is implemented as a combination of hardware, software. Moreover, the software is preferably implemented as an application program tangibly embodied on a program storage device. The application program may be uploaded to, and executed by, a machine of any suitable architecture. The hardware may be an application specific integrated circuit (ASIC), a reduced instruction set computer (RISC), a field programmable gate array (FPGA) or any other suitable form. The block diagram includes a division module, a distance determination module and an allocation module. The modules provides the means for executing the steps of the method of the present invention.

The present invention might be implemented according to embodiments which differ from the disclosed one. For instance, the invention might comprise the step of merging adjacent cells when the sum of the virtual objects and/or of the coding data associated thereto is smaller than the threshold Dmax used to decide whether a division has to be performed or not. Also the distance between cell identifiers can be estimated through different methods such as the Hamming method.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

In any case, implementing the invention delivers the advantages indicated in the publication of M. Varvello, C. Diot and E Biersack entitled *"P2P second life: experimental validation using Kad"* at the Infocom conference of Rio de Janeiro, Brazil, in April 2009, the whole content of which is incorporated by reference to the description of the invention.

The invention claimed is:

1. A method to manage allocation of data to peers in a peer-to-peer network, where the peers in the peer-to-peer network use distributed hash tables for addressing the peers, the peers associated with bit addresses, said method comprising:
    dividing a virtual scene into a plurality of cells, each cell being associated with a bit identifier, neighboring cells of the virtual scene being associated with bit identifiers which differ from each other by only one bit; and
    allocating data coding each cell of the virtual scene to peers whose bit address is closest to the bit identifier of the cells
    wherein the division of the virtual scene into cells is accomplished using a reverse binary tree including nodes and leafs, and
    wherein each node represents a division and each leaf represents a cell generated by the division of a cell at a next higher level having the node from which cell was derived.

2. The method according to claim 1, further comprising determining a distance between peer bit addresses and between cell bit identifiers.

3. The method according to claim 2, wherein the distance determinations are made using one of a bitwise exclusive OR and Hamming codes.

4. The method according to claim 1, the data in the neighboring cells is at least one of common coding data, adjacent elements in the virtual scene and a symmetric property derived from the scene division.

5. The method according to claim 1, wherein at each division the cells differ from all other cells at that level of division by one bit.

6. The method according to claim 1, wherein the allocation is performed iteratively.

7. The method according to claim 1, wherein the cell identifier of each cell is produced by following a binary tree from the virtual scene to reach the leaf representing the cell, and wherein each node is divided into two leafs, each leaf having a bit identifier associated with it, wherein the bit identifiers of each leaf having a common ancestor node and the bit identifiers differing from each other by one bit.

8. The method according to claim 1, wherein the virtual scene has a plurality of dimensions and the method of the present invention is executed independently for each dimension.

9. The method according to claim 1, wherein the scene division of the virtual scene continues until one of an amount of data coded in a cell reaches a threshold and a number of leafs has reached a threshold.

10. The method according to claim 1, wherein the scene division is performed iteratively through a dividing axis which symmetrically splits the scene into two cell having nearly identical sizes.

11. The method according to claim 1, wherein the virtual scene represents a virtual world and a virtual view corresponds to a representation of the virtual world for an avatar guided by an end user within the virtual world.

12. An apparatus to manage allocation of data to peers in a peer-to-peer network, where the peers in the peer-to-peer network use distributed hash tables for addressing the peers, the peers associated with bit addresses, comprising:
    means for dividing a virtual scene into a plurality of cells, each cell being associated with a bit identifier, neighboring cells of the virtual scene being associated with bit identifiers which differ from each other by only one bit; and means for allocating data coding each cell of the virtual scene to peers whose bit address is closest to the bit identifier of the cells wherein the means for dividing the virtual scene into cells is accomplished using a reverse binary tree including nodes and leafs, and wherein each node represents a division and each leaf represents a cell generated by the division of a cell at a next higher level having the node from which cell was derived.

13. The apparatus according to claim 12, further comprising means for determining a distance between peer bit addresses and between cell bit identifiers.

14. The apparatus according to claim 13, wherein the distance determinations are made using one of a bitwise exclusive OR and Hamming codes.

15. The apparatus according to claim 12, the data in the neighboring cells is at least one of common coding data, adjacent elements in the virtual scene and a symmetric property derived from the scene division.

16. The apparatus according to claim 12, wherein the cell identifier of each cell is produced by following a binary tree from the virtual scene to reach the leaf representing the cell, and wherein each node is divided into two leafs, each leaf having a bit identifier associated with it, wherein the bit identifiers of each leaf having a common ancestor node and the bit identifiers differ from each other by one bit.

17. The apparatus according to claim 12, wherein the scene division of the virtual scene continues until one of an amount of data coded in a cell reaches a threshold and a number of leafs has reached a threshold.

18. The apparatus according to claim 12, wherein the scene division is performed iteratively through a dividing axis which symmetrically splits the scene into two cell having nearly identical sizes.

19. The apparatus according to claim 12, wherein said apparatus is a peer in the peer-to-peer network.

\* \* \* \* \*